US011144693B1

(12) United States Patent
Ovadia (10) Patent No.: US 11,144,693 B1
(45) Date of Patent: Oct. 12, 2021

(54) METHOD AND SYSTEM FOR GENERATING VERIFICATION TESTS AT RUNTIME

(71) Applicant: Cadence Design Systems, Inc., San Jose, CA (US)

(72) Inventor: Meir Ovadia, Rosh Ha-ayin (IL)

(73) Assignee: Cadence Design Systems, Inc., San Jose, CA (US)

(*) Notice: Subject to any disclaimer, the term of this patent is extended or adjusted under 35 U.S.C. 154(b) by 0 days.

(21) Appl. No.: 16/698,064

(22) Filed: Nov. 27, 2019

(51) Int. Cl.
*G06F 30/33* (2020.01)
*G06F 30/31* (2020.01)
*G06F 30/20* (2020.01)
G06F 111/02 (2020.01)
H04L 12/26 (2006.01)

(52) U.S. Cl.
CPC .............. *G06F 30/33* (2020.01); *G06F 30/20* (2020.01); *G06F 30/31* (2020.01); *G06F 2111/02* (2020.01); *H04L 43/50* (2013.01)

(58) Field of Classification Search
CPC ...... G06F 30/33; G06F 30/31; G06F 2111/02; G06F 30/20; G06F 30/00; H04L 43/50
See application file for complete search history.

(56) References Cited

U.S. PATENT DOCUMENTS

| 6,457,152 | B1* | 9/2002 | Paley | H04L 29/06 714/33 |
| 6,694,497 | B2* | 2/2004 | Pavey | G01R 31/318342 716/103 |
| 6,876,941 | B2* | 4/2005 | Nightingale | H04L 43/50 702/120 |
| 7,665,067 | B2* | 2/2010 | Hollander | G06F 30/33 717/124 |
| 7,826,381 | B1* | 11/2010 | Kastuar | H04L 43/50 370/242 |
| 7,940,680 | B2* | 5/2011 | Soon | H04L 45/00 370/244 |
| 7,984,194 | B2* | 7/2011 | Xu | H04L 43/50 709/250 |
| 8,560,893 | B1* | 10/2013 | Hollander | G06F 11/00 714/47.1 |

(Continued)

FOREIGN PATENT DOCUMENTS

CN 110678850 A * 1/2020 .......... G06F 11/3688

*Primary Examiner* — Helen Rossoshek
(74) *Attorney, Agent, or Firm* — Pearl Cohen Zedek Latzer Baratz LLP (57) ABSTRACT

A method includes generating on a host machine a validated verification test scenario comprising a graph defining a scheduled performance order of a plurality of actions to be performed on a DUT and a corresponding verification environment; obtaining a subset of one or more actions to be added to the validated scenario while maintaining the plurality of actions of the validated scenario and the scheduled performance order, forming an amended verification test scenario; and applying a runtime solver in a target language of the DUT and the corresponding verification environment on the amended verification test scenario to generate a test in a target code and to apply the test on the DUT and the corresponding verification environment wherein inclusion of any of said one or more actions or an order of performance of said one or more actions of the subset in the test is determined at runtime.

17 Claims, 8 Drawing Sheets

(56) References Cited

U.S. PATENT DOCUMENTS

| | | | | |
|---|---|---|---|---|
| 8,560,985 B1* | 10/2013 | Sahu | ................. | G06F 30/33 |
| | | | | 716/106 |
| 8,874,457 B2* | 10/2014 | Biran | ................. | G06Q 10/0637 |
| | | | | 705/7.12 |
| 9,195,784 B2* | 11/2015 | Tseng | ................. | G06F 30/331 |
| 9,208,451 B2* | 12/2015 | Katz | ................. | G06F 11/263 |
| 9,316,689 B2* | 4/2016 | Hamid | ................. | G06T 11/206 |
| 9,588,177 B1* | 3/2017 | Atwood | ................. | G01R 31/31707 |
| 9,660,739 B2* | 5/2017 | Reed | ................. | H04B 17/12 |
| 9,792,402 B1* | 10/2017 | Ovadia | ................. | G06F 11/322 |
| 9,823,305 B1* | 11/2017 | Ovadia | ................. | G01R 31/3177 |
| 9,823,988 B2* | 11/2017 | Kodama | ................. | H04L 43/50 |
| 9,858,371 B1* | 1/2018 | Ovadia | ................. | G06F 30/367 |
| 10,295,596 B1* | 5/2019 | Ovadia | ................. | G01R 31/318307 |
| 10,397,386 B1* | 8/2019 | Zhang | ................. | G09G 3/006 |
| 10,503,854 B1* | 12/2019 | Ovadia | ................. | G06F 30/33 |
| 10,579,761 B1* | 3/2020 | Ovadia | ................. | G06F 16/9024 |
| 10,698,805 B1* | 6/2020 | Ovadia | ................. | G06F 11/3636 |
| 10,733,345 B1* | 8/2020 | Ovadia | ................. | G06F 30/3323 |
| 2002/0169815 A1* | 11/2002 | Wong | ................. | G06F 11/261 |
| | | | | 718/100 |
| 2019/0251219 A1* | 8/2019 | Behrend | ................. | G06F 30/3323 |
| 2020/0200820 A1* | 6/2020 | Strasser | ................. | G01R 31/318307 |
| 2020/0272548 A1* | 8/2020 | Carrington | ................. | G06F 11/3409 |
| 2020/0313999 A1* | 10/2020 | Lee | ................. | H04L 43/106 |

\* cited by examiner

METHOD AND SYSTEM FOR GENERATING VERIFICATION TESTS AT RUNTIME

FIELD OF THE INVENTION

The present invention relates to verification of electronic designs and more particularly to methods and systems for processing verification tests for testing a design under test (DUT).

BACKGROUND

Design verification is a common process for testing a newly designed integrated electronic circuit, board, or system-level architecture, to, for example, confirm that it complies with the requirements defined by the specification of the architecture for that device. Design verification for a device under test (DUT) may be performed on the actual device but is typically performed on a simulation model of the device to be tested, and its verification environment.

Verification of electronic designs typically has three forms. At an early stage, before the electronic design is implemented in hardware, simulation can be conducted on a model of the design. Another form can be emulation, in which one electronic hardware is used to mimic the behavior of another (tested) electronic hardware. At more advanced stages of design development a system on chip can be verified, in a process which is typically referred to as post-silicon verification. Post-silicon verification can be a last stage in the electronic design development, for example, before it is manufactured.

Post-silicon verification tests can be carried out on actual devices running at high speed on realistic system boards, the results of which can be assessed by a logic analyzer and other verification tools.

In a typical verification process an electronic design undergoes testing which includes designing various testing scenarios which are generated as code and executed on the DUT and its corresponding verification environment.

Verification tests typically include a plurality of actions that are to be executed, in order to test the validity of the planned design of the DUT.

An electronic system (e.g., a smartphone) may typically be made up of a plurality of electronic devices (e.g., memory, camera, central processing unit—CPU, graphical processing unit—GPU, microphone, media player, etc.). At the early stages in the development of electronic design, a model of each of the electronic devices that form the electronic system can be built (typically in Verilog or other HDL language and verified, by simulating executions of a multitude of tests on the on a simulation of the device under test (DUT). In order to, for example, efficiently cover all (or substantially all) functionalities of the DUT a plurality of tests can be generated. The plurality of tests can be pieces of code, e.g., C-code, assembly, and/or other codes as are known in the art. Each of the plurality of tests can be generated from one of various scenarios which can be constructed by a one or a plurality of verification experts (hereinafter "user" or "users"). Each scenario can be made up of a plurality of actions which the user selects to be included in the scenario. The user may also define the order in which the selected actions are to be performed—consecutively or concurrently.

Commonly, there are two approaches to generating verification tests.

A first approach, is a static approach in which a user provides their input that may include test requirements (e.g., model, actions and/or constraints) to an electronic design automation (EDA) tool running on a host machine. A solver of the EDA tool may find a valid solution (e.g., a scenario that meets the test requirements) and the EDA tool may generate a test code of the valid solution and execute it. For example, a user may input actions (e.g., "do_A(a,b,c . . . )", "do_B(d,e,f . . . )", etc., in a predetermined order, or input a scheduling command that may arrange the actions consecutively (e.g., B after A or A after B) or concurrently (e.g., A and B concurrently). The user may also add constraints, and the test, or tests, may then be generated by the EDA tool on the host machine, and be applied to the DUT and corresponding verification environment at runtime. In the static approach the user may have some effect on randomization by way of randomizing data objects (e.g., primitive types and structs), but not on the actions of the test and their order of performance.

A second approach, is a dynamic approach that involves generating tests at runtime, on the tested system (e.g., DUT and verification environment). For example, a dynamic approach can include using a hardware verification language such as Portable Stimulus Specification (PSS). Generating tests at runtime can involve setting various states, conditions and/or parameters instantaneously (or substantially instantaneously set) at runtime to, for example, produce a specific test, which can be executed instantly (or substantially instantaneously) thereafter. During the generation of tests, specific instantaneous runtime conditions (e.g., specific clock time) may dynamically affect the generation of a test in a unique way thereby producing a unique test that may be a part of a set of a versatile set of tests, in which, for example, influenced by runtime conditions, actions (e.g., action "A", action "B", action "C", action "D", etc.) are scheduled to be performed in various orders (e.g., in one generated test action "A" is to be performed before action "B", in another generated test action "A" is to be performed after action "B", in a third generated test actions "A" and "B" are to be performed concurrently).

While generating verification tests at runtime may produce versatile tests, it may sometimes result in generation of unsuccessful tests that fail to properly test the DUT, inefficient tests that return unsatisfactory results and/or enormously big tests that may be too big for some system architectures, for example systems operating under portable test and stimulus standard (PSS) specification (e.g., ARM, AVR32, MISP, POWER ISA, etc.). Generating and promptly executing these tests thereafter may result in significant loss of time, inefficient and/or wasteful use of computing resources and can slow down the verification process. The slow-down in the verification process can be due to, for example, a runtime solver injecting the generated tests directly into the system to be tested regardless of their size and efficiency, and due to scarce system resources when generating the tests as the solver is operating on a basic system with limited resources.

A current system includes an EDA tool (e.g., a system verifier) that can allow a user to view and/or work on a graph representation of a scenario. Such EDA tool can allow constructing and/or rearranging the scenario by automatically or manually placing actions (e.g., symbols of the actions) from a set of available actions into a designated space in a graphical user interface, to form a graph representation of a desired verification test, defining the relations between the selected actions (the order in which they are to be performed—e.g., sequentially or in parallel), to construct a scenario. Typically, the graphical representation of the scenario is a directed graph, where actions of the scenario are vertices (e.g., nodes) and are connected by directed edges.

A scenario may include, for example, a set of actions put together or by a processor or by a user in a graph representation form, that may eventually be converted into target code file and used for testing the DUT.

Such an EDA tool may be used in the construction of verification tests and in verifying that these tests comply with various constraints and system requirements.

A validated scenario that appears to comply with system requirements and with test constraints (also referred to as "solution") may then be converted by the EDA tool into a test by generating a target code file, which is an executable code, such as, for example, C-code or Assembly. That test may be used to test the DUT and the verification environment in the verification process.

Working on a graph representation may make it easier for the human user to see and understand relations between actions and may consequently increase the efficiency and productivity of a verification expert to work with verification tests.

However, if the generated solution includes determined parameters, for example, specific values of variables, e.g., structs, including primitives and their associated constraints, the resulting generated test may only include fixed values of parameters for specific constraints, so that, for example, the order of actions to be executed is predetermined and runtime conditions may have no effect on the generated tests, for example, no effect on the order of the performance of actions in the generated tests.

It may be desired to provide methods and systems to generate verification tests where one or a plurality of parameters of the test are only set at runtime, thereby increasing versatility of the generated tests and/or generate tests that are affected by instantaneous runtime conditions.

SUMMARY

There is thus provided, according to some embodiments of the present invention, a method for generating verification tests at runtime. The method includes generating on a host machine a validated verification test scenario comprising a plurality of actions in a scheduled performance order to be performed on a DUT. The method also includes by the host machine, one or more actions to be added to the validated verification test scenario while maintaining the plurality of actions of the validated verification test scenario and the scheduled performance order, to form an amended verification test scenario. The method also includes applying a runtime solver in a verification environment of the DUT on the amended verification test scenario to generate and apply at runtime a test on the DUT wherein inclusion of any of said one or more actions or an order of performance of said one or more actions in the test is determined at the runtime.

According to some embodiments of the invention, said one or more actions is added between two actions of said plurality of actions that are linked on a graph representation of the validated verification test scenario by an edge.

According to some embodiments of the invention, the method further includes verifying that the amended verification test scenario complies with system resources of the DUT and the corresponding verification environment and with defined constraints.

According to some embodiments of the invention, verifying that the amended verification test scenario complies with system resources of the DUT and the corresponding verification environment and with defined constraints is performed on the host machine.

According to some embodiments of the invention, the method further includes obtaining information on the system resources.

According to some embodiments of the invention, the information on the system resources includes information on memory and memory allocation for the DUT and the corresponding verification environment.

According to some embodiments of the invention, the method further includes determining, by the processor, that the amended verification test scenario does not comply with the system resources of the DUT and the corresponding verification environment and with the defined constraints and issuing a notification.

According to some embodiments of the invention, the method further includes discarding the amended verification test scenario.

According to some embodiments of the invention, there is provided a non-transitory computer readable storage medium for generating verification tests at runtime, having stored thereon instructions that when executed by a processor will cause the processor to: generate, on a host machine, a validated verification test scenario comprising a plurality of actions in a scheduled performance order to be performed on a DUT; receive, by the host machine, one or more actions to be added to the validated verification test scenario while maintaining the plurality of actions of the validated verification test scenario and the scheduled performance order, to form an amended verification test scenario; apply a runtime solver in a verification environment of the DUT on the amended verification test scenario to generate and apply at runtime a test on the DUT wherein inclusion of any of said one or more actions or an order of performance of said one or more actions in the test is determined at the runtime; and verify that the amended verification test scenario complies with system resources of the DUT and the corresponding verification environment and with defined constraints According to some embodiments of the invention, there is also provided a system for processing verification tests for generating verification tests at runtime. The system includes a memory and a processor configured to: generate, on a host machine, a validated verification test scenario comprising a plurality of actions in a scheduled performance order to be performed on a DUT; receive, by the host machine, one or more actions to be added to the validated verification test scenario while maintaining the plurality of actions of the validated verification test scenario and the scheduled performance order, to form an amended verification test scenario; and apply a runtime solver in a verification environment of the DUT on the amended verification test scenario to generate and apply at runtime a test on the DUT wherein inclusion of any of said one or more actions or an order of performance of said one or more actions in the test is determined at the runtime.

BRIEF DESCRIPTION OF THE DRAWINGS

In order to better understand the present invention, and appreciate its practical applications, the following figures are provided and referenced hereafter. It should be noted that the figures are given as examples only and in no way limit the scope of the invention. Like components are denoted by like reference numerals.

DETAILED DESCRIPTION OF EMBODIMENTS OF THE INVENTION

In the following detailed description, numerous specific details are set forth in order to provide a thorough understanding of the methods and systems. However, it will be understood by those skilled in the art that the present methods and systems may be practiced without these specific details. In other instances, well-known methods, procedures, and components have not been described in detail so as not to obscure the present methods and systems.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

According to some embodiments of the present invention, a host machine (e.g., a computer, a server, a computing device which is operated by an operating system, for example, a Unix system machine, Unix-like machine, Linux machine) may be used to generate (e.g., using a solver) one or a plurality of validated verification test scenarios, each of which comprises a graph including actions to be performed when testing a DUT and a corresponding verification environment, and defining a scheduled performance order of these actions.

Figure 1:
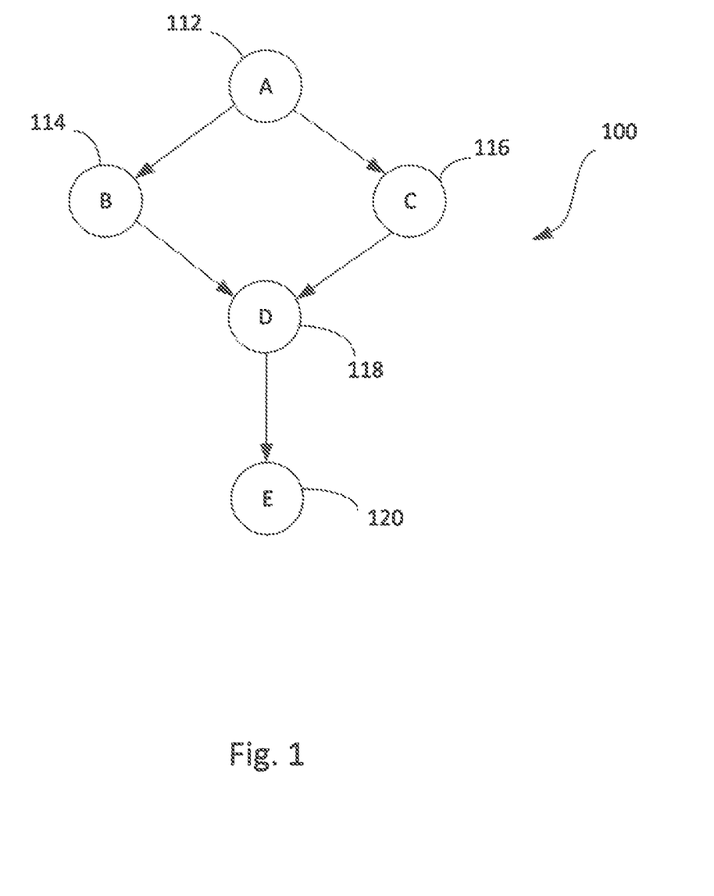
FIG. 1 shows a graph representation of a validated verification test scenario, according to some embodiments of the invention, which may be generated on a host machine.

FIG. 1 shows a graph representation 100 of a validated verification test scenario, according to some embodiments of the invention, which may be generated on a host machine.

Validated verification test scenario 100 may include five actions, e.g., A, B, C, D and E. Actions A (112), B (114), C (116) and D (118) are nodes in graph 100, arranged in a manner indicating that action A 112 is to be performed first, followed by actions B 114 and C 116, which are to be performed concurrently. When actions B and C have been completed, action D 118 is to be performed, followed by the performance of action E 120.

According to some embodiments of the present invention, a user may be prompted or otherwise invited or allowed to add a subset of one or more actions to the validated verification test scenario, forming an amended verification test scenario, for example by performing "drag and drop" action on a graphical user interface, using a pointer device, to hold, drag and drop an action, or otherwise adding the subset of one or more actions.

The added subset of one or more actions, according to some embodiments of the invention, has to maintain the plurality of actions of the validated verification test scenario and their scheduled performance order. The prevention of making any changes to the original arrangement and scheduled order of performance of the actions of the validated verification test scenario is aimed at reducing the risk of invalidating the amended verification test scenario.

According to some embodiments of the invention, the amended verification test scenario may be validated using the EDA tool on the host machine, that checks to determine whether the amended verification test scenario complies with the requirements and constraints of the model representing the DUT and its corresponding verification environment. If it does not comply with these requirements and/or constraints that amended verification test scenario is not used for generating a test and may be discarded. In some embodiments of the invention, an EDA tool may issue a notification, e.g., cause a message to be displayed on a screen, sound an alarm sound etc. to draw the attraction of the user to the failed amended verification test scenario. In some embodiments the user may be prompted, or otherwise invited or allowed to add another set of one or more actions to a validated verification test scenario and start the process to check if that amended verification test scenario may produce valid tests.

Figure 2A:
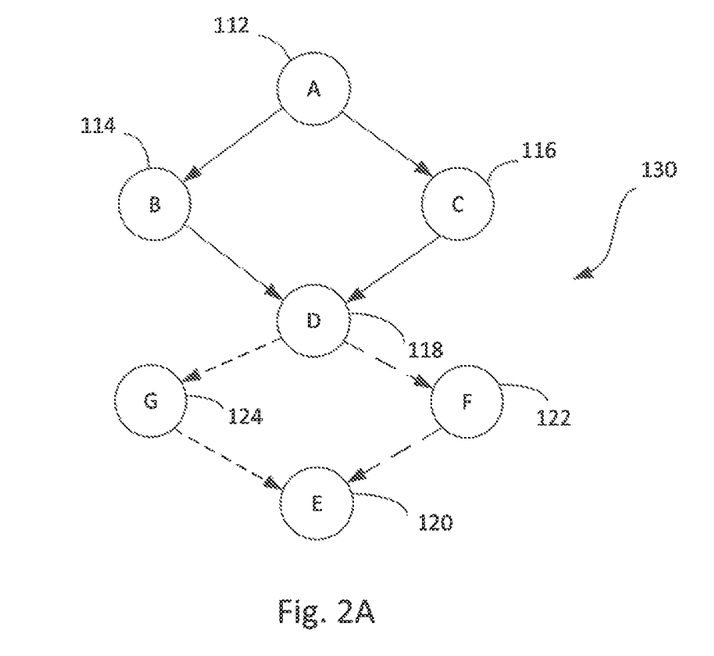
FIG. 2A shows a graph representation of an amended verification test scenario, according to some embodiments of the invention.
Figure 2B:
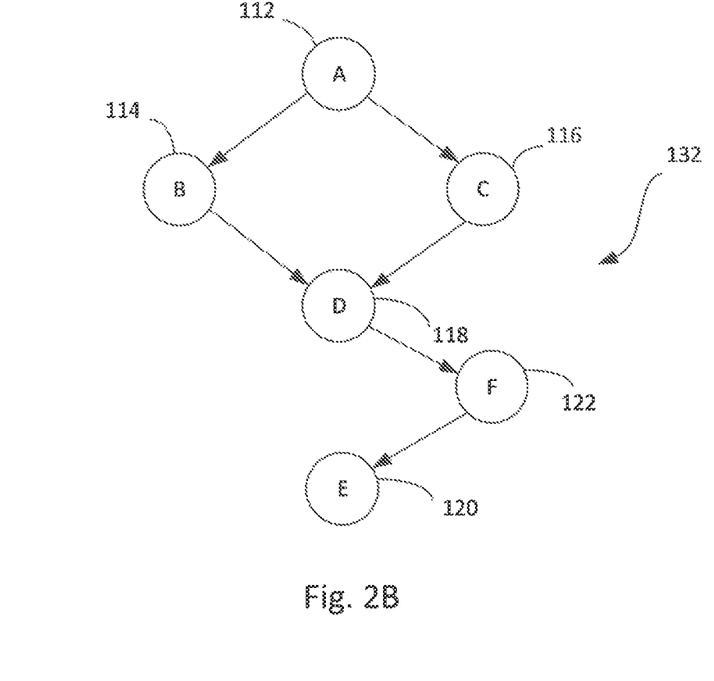
FIG. 2B shows a graph representation of a test generated from the amended verification test scenario shown in FIG. 2B, according to some embodiments of the invention.
Figure 2C:
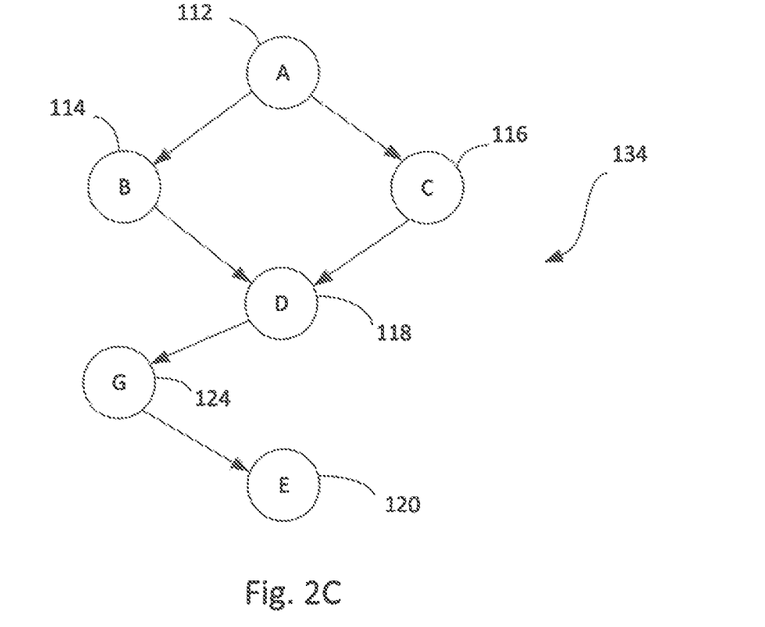
FIG. 2C shows a graph representation of another test generated from the amended verification test scenario shown in FIG. 2B, according to some embodiments of the invention.
Figure 2D:
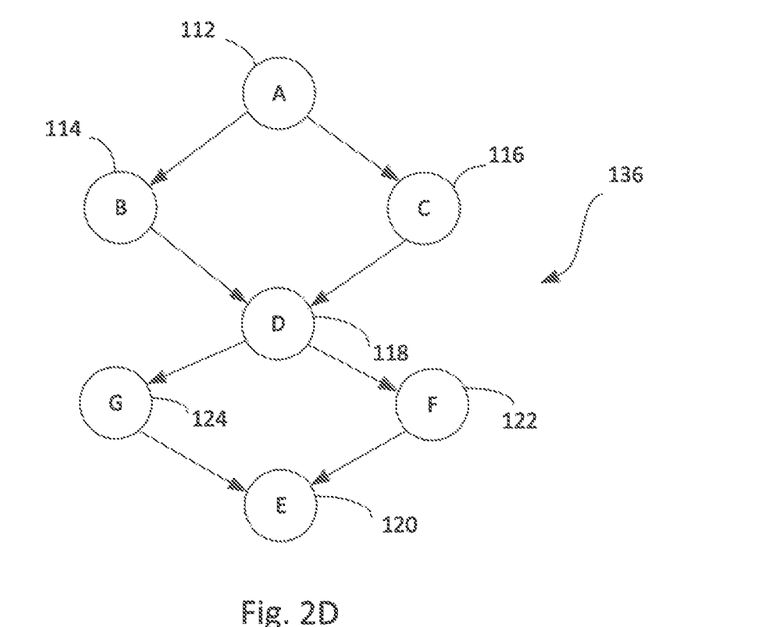
FIG. 2D shows a graph representation of yet another test generated from the amended verification test scenario shown in FIG. 2B, according to some embodiments of the invention.

FIG. 2A shows a graph representation of an amended verification test scenario, according to some embodiments of the invention. Amended verification test scenario 130 includes all the actions originally present in the validated verification test scenario shown in FIG. 1, with an added subset of two actions—action F 122 and action G 124. In this example, actions F and G are two alternatives—if validated, the amended verification scenario is to eventually to be used to generate either of two alternative tests in runtime, depending on runtime conditions: in one test (test 132 in FIG. 2B) action D 118 is followed, after completion by action F 122, which in turn, after completion is followed by action E 120, and in the other test (test 134 in FIG. 2C) action D 118 is followed, after completion by action G 124, which in turn, after completion is followed by action E 120. According to some embodiments of the invention no test will be generated that includes both action F and action G. The inclusion of action F or action G in the generated test is determined, according to some embodiments of the invention, at runtime, based on instantaneous conditions (e.g., clock). In some embodiments of the invention, a third test may be generated at runtime (test 136 in FIG. 2D), where both actions F and G may be included—to be performed concurrently—in the generated test, if runtime conditions allow for that to happen.

Figure 3A:
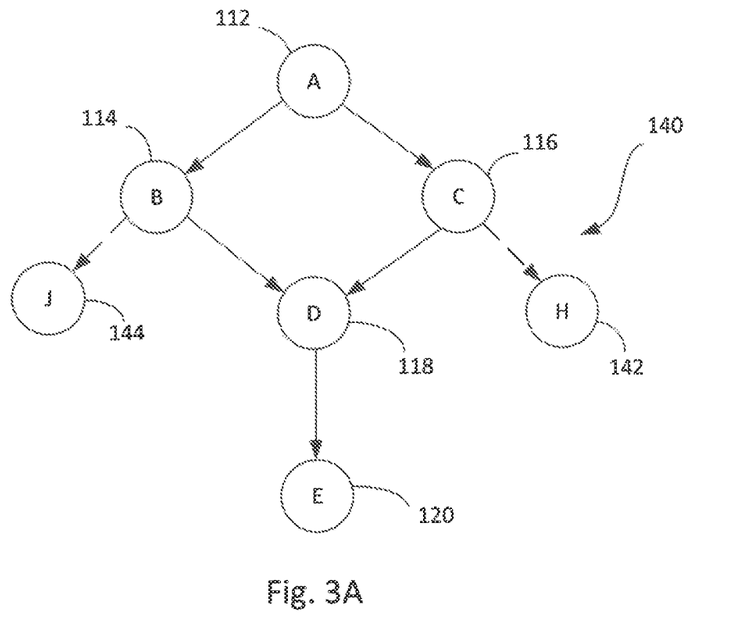
FIG. 3A shows a graph representation of yet another amended verification test scenario, according to some embodiments of the invention.

FIG. 3A shows a graph representation of yet another amended verification test scenario, according to some embodiments of the invention. Amended verification test scenario 140 includes all the actions originally present in the validated verification test scenario shown in FIG. 1, with two added alternative actions—action H 142, that follows action C 116 and action J 144, that follows action B 114. if validated, the amended verification scenario is to eventually be used to generate either of several alternative tests in runtime, depending on runtime conditions. The generated tests may each include or not include action H and/or include or not include action J.

Figure 3B:
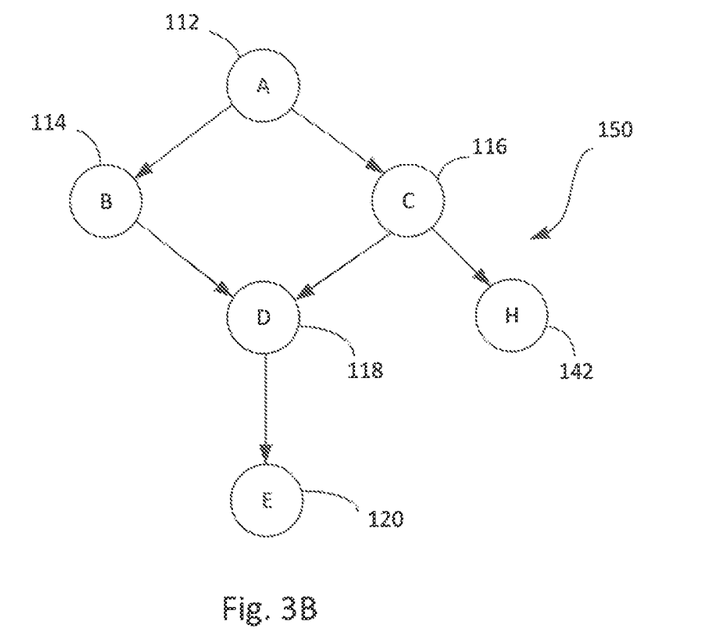
FIG. 3B shows a graph representation of a generated test based on the amended verification test scenario of FIG. 3A, according to some embodiments of the invention.
Figure 3C:
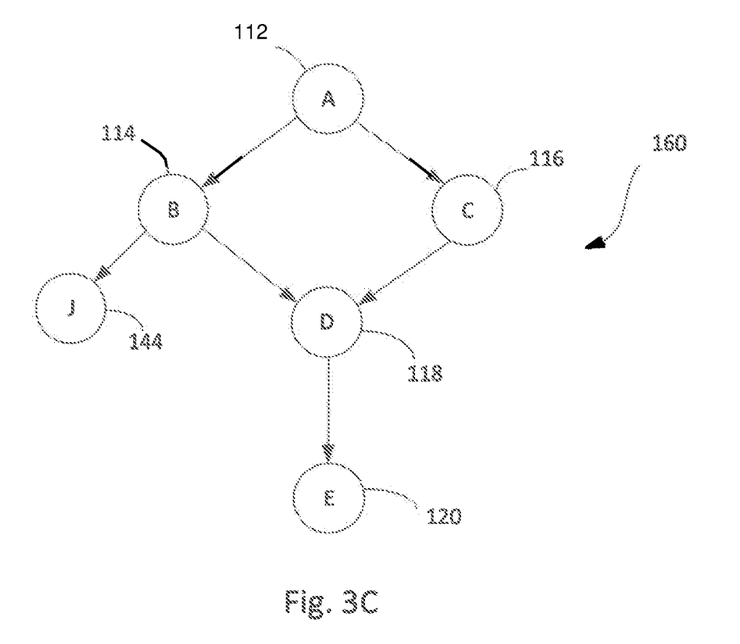
FIG. 3C shows a graph representation of a generated test based on the amended verification test scenario of FIG. 3A, according to some embodiments of the invention.

In one possible test action H is included and action J is not (see test 150 in FIG. 3B), as an action to be performed after action C is completed, in a second test (see test 160 in FIG. 3C) action J is included and action H is included. Other alternative tests generated in run time from amended verification test scenario 140 may include a test with both action G and action H, and another test without any of actions G and H.

The addition of a subset of one or more actions, whose inclusion in the generated test or tests as and/or their order of performance is determined at runtime increases the versatility of tests generated, adding some "randomness" attributed to the prevailing instantaneous runtime conditions that affect the generated tests.

Figure 4:
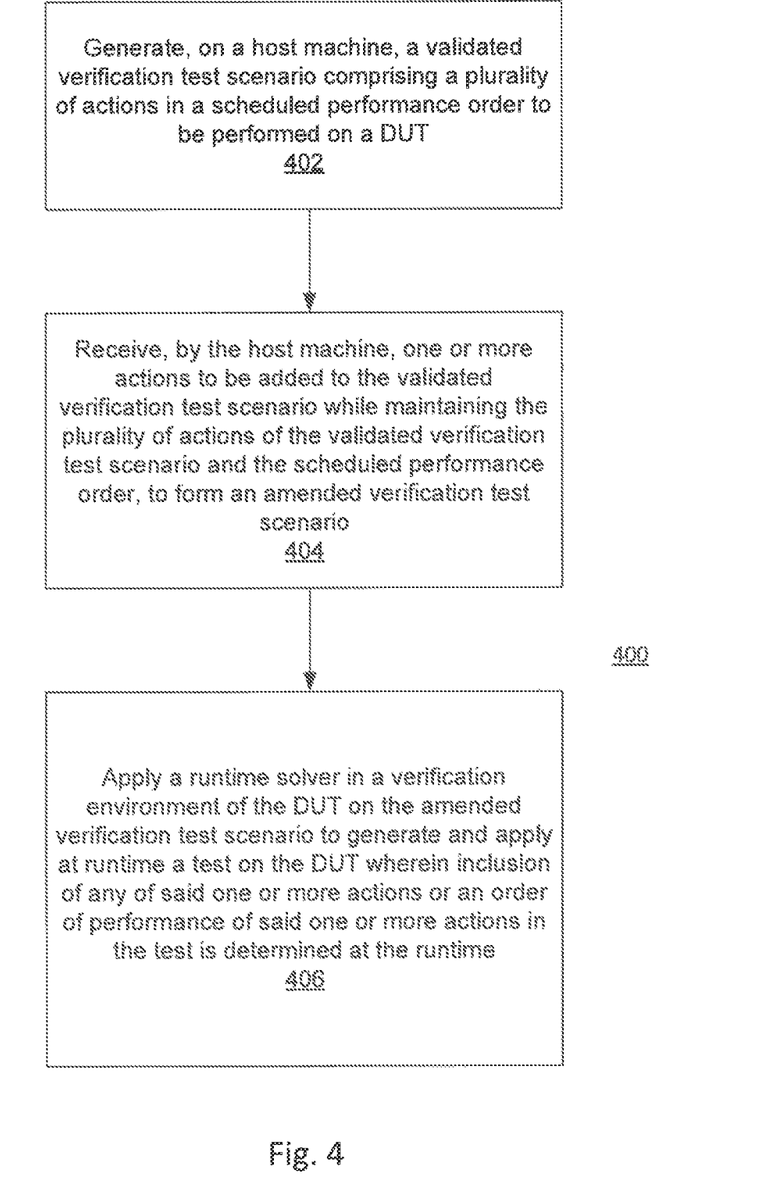
FIG. 4 shows a method for generating verification tests at runtime, according to some embodiments of the invention.

FIG. 4 shows a method for generating verification tests at runtime, according to some embodiments of the invention.

Method 400 may include generating 402 on a host machine a validated verification test scenario comprising a plurality of actions in a scheduled performance order to be performed on a DUT. A pre-run solver of an EDA tool may be used to generate one or a plurality of validated verification test scenarios. The generated validated verification test scenarios may be represented in graph form, in which actions are nodes and their order of performance is determined by their order along the graph and the edges connecting between nodes.

Method 400 may include receiving 404, by the host machine, one or more actions to be added to the validated verification test scenario while maintaining the plurality of actions of the validated verification test scenario and the scheduled performance order, to form an amended verification test scenario. An EDA tool may present a user with a graphical user interface (GUI) which allows the user to view a generated validated verification test scenario on a display device, and allows the user, for example by a pointing device, a touch sensitive screen, a keyboard, another input device, etc. to add one or more actions, according to some embodiments of the invention. In adding the action or actions the user may be required to keep the original actions of the generated validated verification test scenario and add the action or actions without changing the performance order of the original actions of the validated scenario. In some embodiments of the invention the EDA tool may automatically verify that the added action or actions do not affect the original actions, their order of performance, and may indicated to the user (e.g., by an alarm or a message) if the added action or actions in fact remove any of the original actions or change their order of performance.

Method 400 may include applying 406, a runtime solver in a verification environment of the DUT on the amended verification test scenario to generate and apply at runtime a test on the DUT wherein inclusion of any of said one or more actions or an order of performance of said one or more actions in the test is determined at the runtime.

In some embodiments of the invention, the subset of one or more actions is added between two actions of said plurality of actions that are linked on a graph representation of the validated verification test scenario by an edge. In some embodiments of the invention, said one or more actions is appended to an action of said plurality of action, with no further action or actions linked by an edge or edges to said one or more actions.

In some embodiments of the invention the method may further include verifying that the amended verification test scenario complies with system resources of the DUT and the corresponding verification environment and with defined constraints. Verifying the compliance of the amended verification test scenario may be performed on the host machine.

In some embodiments of the invention the EDA tool operating on the host machine may obtain information on the system resources. Such information may include, for example information on the size of the memory available for the DUT and corresponding verification environment. Such information may also include information on memory allocation for the DUT and corresponding verification environment. The obtained information may be provided by a user (e.g., via a user interface) or exist as saved or transmitted data.

In some embodiments of the invention, the method for generating verification tests at runtime may include determining, by the processor, that the amended verification test scenario does not comply with the system resources of the DUT and the corresponding verification environment and with the defined constraints and issuing a notification. Upon determining that the amended verification test scenario does not comply with the system resources of the DUT the user may be prompted by a notification (e.g., a message, an alarm etc.) to draw the attention of the user to the non-compliance of the amended verification test scenario. The user may then decide to pursue other ways (e.g., produce a new amended verification test scenario, check the cause of determining that the amended verification test scenario does not comply with the system resources, or take other actions. In some embodiments of the invention the EDA tool may discard the amended verification test scenario.

According to some embodiments of the invention the generation of amended verification test scenarios on the host machine may benefit from the abundance and quality of resources a host machine may offer—powerful computing power, plenty of memory—which allow for fast and efficient pre-run generation of amended verification test scenarios. Furthermore, the generated amended verification test scenarios may be reviewed on the host machine to determine compliance with the tested system resources (the DUT and corresponding verification environment), again benefitting from the abundance and quality of resources a host machine may offer.

The flexibility ("randomness") of generated verification tests at runtime, according to some embodiments of the invention, is limited to the manipulation of one or more actions in the subset of actions at the runtime, while the remaining validated verification test scenario is left in its original arrangement (in place and obeying the original order of performance, as defined in the generation of the validated scenario). So, effectively the "randomization" affected at runtime is typically isolated to the one or more actions added by the user.

Figure 5:
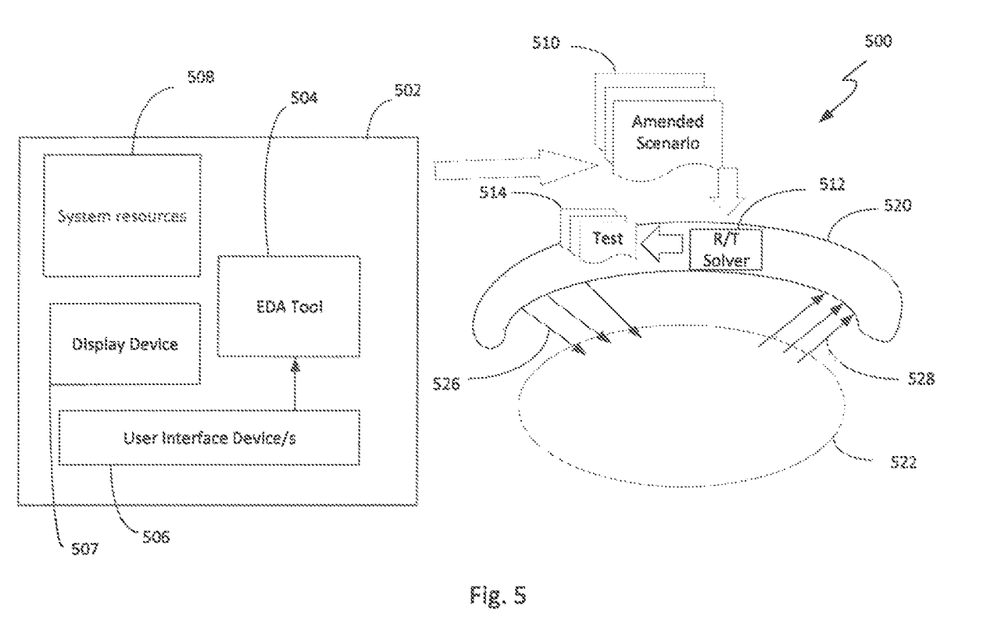
FIG. 5 illustrates a system 500 for generating verification tests at runtime, according to some embodiments of the present invention.

FIG. 5 illustrates a system 500 for generating verification tests at runtime, according to some embodiments of the present invention. System 500 typically includes a host machine 302 (e.g., a Linux operated computer) that has system resources (e.g., one or a plurality of processors, memory, memory management, storage, interfaces, such as for example user interface device/s 506) and an EDA tool 504 for generating validated verification test scenarios, in accordance with some embodiments of the present invention. A generated validated verification test scenario, according to some embodiments of the invention, may be presented to the user (e.g., on a display device 507) in the form of a graph representation with actions of the generated validated verification test scenario as nodes, and the order of performance of the actions defined by edges between the nodes. The EDA tool 504 may allow the user to input a subset of one or more actions to the generated validated verification test scenario, e.g., using the user interface device/s 506) according to some embodiments of the invention, and placing the one or more actions as may desire and affecting edge or edges to and/or from the added one or more actions, as appropriate. The EDA tool may affect compliance with the requirement that the original actions in the scenario remain (e.g. may not be removed or moved around in the scenario) and that their order of performance is kept, for example by verifying that this requirement is met and preventing changes that would fail this requirement. Amended verification test scenarios 510 may be generated by the EDA tool, and transmitted to a runtime solver 512 embedded in a verification environment (e.g., testbench) 520 of a DUT 522. The runtime solver 512 may generate tests 514 in target code in runtime to test the DUT 522 and/or the verification environment 520. Data passing between the verification environment 520 and the DUT 522 (data transmission/s 526 into the DUT 522 and data transmissions 528 out of the DUT 522 may be monitored).

Figure 6:
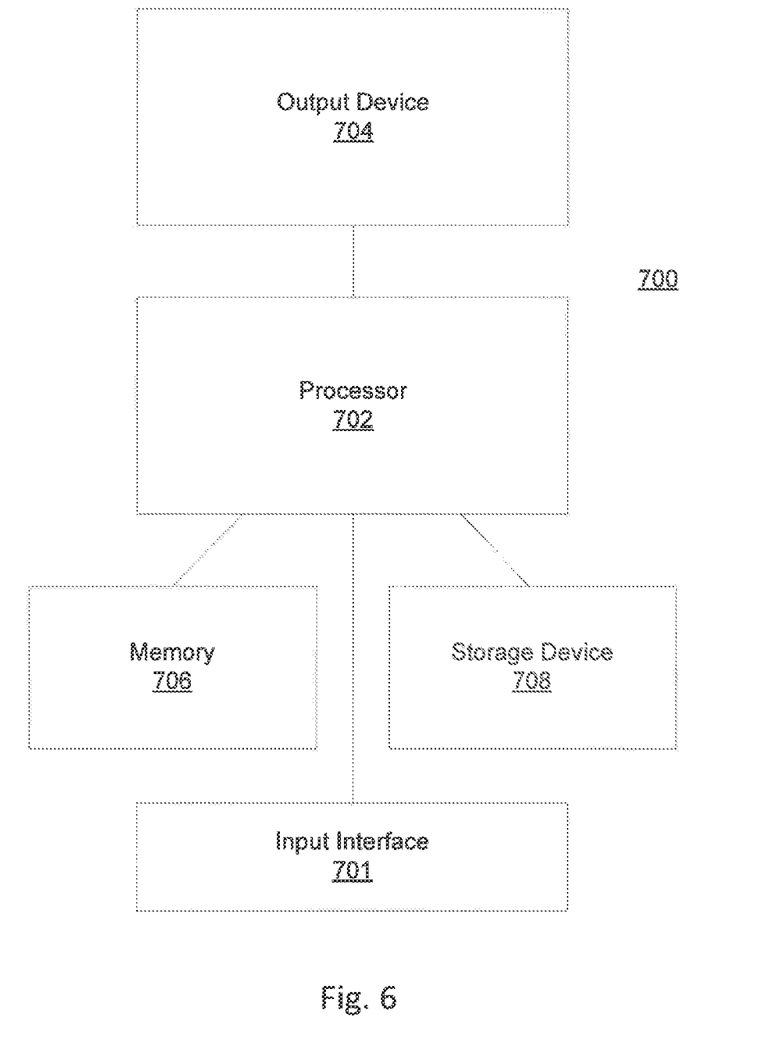
FIG. 6 is a block diagram of a host machine system 700 according to some embodiments of the invention.

FIG. 6 is a block diagram of a host machine system 700 according to some embodiments of the invention. Host machine 700 may include a processor 702 (e.g. single processor or a processing unit made that includes a plurality of processors, on a single machine or distributed on a plurality of machines) for executing a method according to some embodiments of the present invention.

Processor 702 may be linked with memory 706 on which a program implementing a method according to some embodiments of the present invention and corresponding data may be loaded and run from, and storage device 708, which includes a non-transitory computer readable medium (or mediums) such as, for example, one or a plurality of hard disks, flash memory devices, etc. on which a program implementing a method according to some embodiments of the present invention and corresponding data may be stored. system 700 may further include an output device 704 (e.g. display device such as CRT, LCD, LED etc.) on which one or a plurality user interfaces associated with a program implementing a method according to some embodiments of the present invention and corresponding data may be presented. System 700 may also include input interface 701, such as, for example, one or a plurality of keyboards, pointing devices, touch sensitive surfaces (e.g. touch sensitive screens), etc. for allowing a user to input commands and data.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with examples. In some examples the instructions stores on the computer readable medium may be in the form of an installed application and in the form of an installation package.

Such instructions may be, for example, loaded by one or more processors and get executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

Some embodiments are described hereinabove with reference to flowcharts and/or block diagrams depicting methods, systems and computer program products according to various embodiments.

Features of various embodiments discussed herein may be used with other embodiments discussed herein. The foregoing description of the embodiments has been presented for the purposes of illustration and description. It is not intended to be exhaustive or limiting to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes that fall within the true spirit of the present invention.

The invention claimed is:

1. A method for generating verification tests at runtime, the method comprising:
   generating, on a host machine, a validated verification test scenario comprising a plurality of actions in a scheduled performance order to be performed on a DUT;
   receiving, by the host machine, a subset of one or more actions to be added to the validated verification test scenario while maintaining the plurality of actions of the validated verification test scenario and the scheduled performance order, to form an amended verification test scenario; and
   applying a runtime solver in a corresponding verification environment of the DUT on the amended verification test scenario to generate and apply at runtime a test on the DUT wherein inclusion of any action of said subset of one or more actions or an order of performance of said subset of one or more actions in the test is determined at the runtime while maintaining the scheduled performance order,
   wherein said subset of one or more actions is added between two actions of said plurality of actions that are linked on a graph representation of the validated verification test scenario by an edge.

2. The method of claim 1, further comprising verifying that the amended verification test scenario complies with system resources of the DUT and the corresponding verification environment and with defined constraints.

3. The method of claim 2, wherein verifying that the amended verification test scenario complies with system resources of the DUT and the corresponding verification environment and with defined constraints is performed on the host machine.

4. The method of claim 2, further comprising obtaining information on the system resources.

5. The method of claim 4, wherein the information on the system resources includes information on memory and memory allocation for the DUT and the corresponding verification environment.

6. The method of claim 2, further comprising determining, by the processor, that the amended verification test scenario does not comply with the system resources of the DUT and the corresponding verification environment and with the defined constraints and issuing a notification.

7. The method of claim 6, further comprising discarding the amended verification test scenario.

8. A non-transitory computer readable storage medium for generating verification tests at runtime, having stored thereon instructions that when executed by a processor will cause the processor to:
generate, on a host machine, a validated verification test scenario comprising a plurality of actions in a scheduled performance order to be performed on a DUT;
receive, by the host machine, a subset of one or more actions to be added to the validated verification test scenario while maintaining the plurality of actions of the validated verification test scenario and the scheduled performance order, to form an amended verification test scenario;
apply a runtime solver in a verification environment of the DUT on the amended verification test scenario to generate and apply at runtime a test on the DUT wherein inclusion of any action of said subset of one or more actions or an order of performance of said subset of one or more actions in the test is determined at the runtime while maintaining the scheduled performance order; and
verify that the amended verification test scenario complies with system resources of the DUT and the corresponding verification environment and with defined constraints,
wherein said subset of one or more actions is added between two actions of said plurality of actions that are linked on a graph representation of the validated verification test scenario by an edge.

9. The non-transitory computer readable storage medium of claim 8, having stored thereon instructions that when executed by a processor will cause the processor to verify that the amended verification test scenario complies with system resources of the DUT and the corresponding verification environment and with defined constraints on the host machine.

10. A system for processing verification tests for generating verification tests at runtime, the system comprising:
a memory and
a processor configured to:
generate, on a host machine, a validated verification test scenario comprising a plurality of actions in a scheduled performance order to be performed on a DUT;
receive, by the host machine, a subset of one or more actions to be added to the validated verification test scenario while maintaining the plurality of actions of the validated verification test scenario and the scheduled performance order, to form an amended verification test scenario; and
apply a runtime solver in a verification environment of the DUT on the amended verification test scenario to generate and apply at runtime a test on the DUT wherein inclusion of any action of said subset of one or more actions or an order of performance of said subset of one or more actions in the test is determined at the runtime while maintaining the scheduled performance order,
wherein the subset of one or more actions is added between two actions of said plurality of actions that are linked on a graph representation of the validated verification test scenario by an edge.

11. The system of claim 10, wherein said subset of one or more actions is appended to an action of said plurality of action, with no further action or actions linked to said subset of one or more actions.

12. The system of claim 10, wherein the processor is further configured to verify that the amended verification test scenario complies with system resources of the DUT and the corresponding verification environment and with defined constraints.

13. The system of claim 12, wherein the processor is configured to perform on the host machine the verifying that the amended verification test scenario complies with system resources of the DUT and the corresponding verification environment and with defined constraints.

14. The system of claim 12, further comprising obtaining information on the system resources.

15. The system of claim 14, wherein the information on the system resources includes information on memory and memory allocation for the DUT and the corresponding verification environment.

16. The system of claim 12, wherein the processor is further configured to determine that the amended verification test scenario does not comply with the system resources of the DUT and the corresponding verification environment and with the defined constraints and issuing a notification.

17. The system of claim 16, wherein the processor is further configured to discard the amended verification test scenario.

* * * * *